United States Patent
Meng et al.

(10) Patent No.: US 12,043,794 B2
(45) Date of Patent: Jul. 23, 2024

(54) OIL AND GAS FIELD CORROSION INHIBITOR COMPOSITIONS

(71) Applicants: KAO CORPORATION, Tokyo (JP); CHEMEOR, INC., Covina, CA (US)

(72) Inventors: Fei Meng, Covina, CA (US); Mitsuru Uno, Wakayama (JP); Yongchun Tang, Covina, CA (US)

(73) Assignees: KAO CORPORATION, Tokyo (JP); CHEMEOR, INC., Covina, CA (US)

( * ) Notice: Subject to any disclaimer, the term of this patent is extended or adjusted under 35 U.S.C. 154(b) by 643 days.

(21) Appl. No.: 17/271,116

(22) PCT Filed: Aug. 27, 2019

(86) PCT No.: PCT/US2019/048380
§ 371 (c)(1),
(2) Date: Feb. 24, 2021

(87) PCT Pub. No.: WO2020/046967
PCT Pub. Date: Mar. 5, 2020

(65) Prior Publication Data
US 2021/0253938 A1 Aug. 19, 2021

Related U.S. Application Data

(60) Provisional application No. 62/723,602, filed on Aug. 28, 2018.

(51) Int. Cl.
| | | |
|---|---|---|
| *C09K 8/54* | (2006.01) | |
| *C09K 15/18* | (2006.01) | |
| *C09K 15/26* | (2006.01) | |
| *C23F 11/14* | (2006.01) | |
| *C23F 11/16* | (2006.01) | |

(52) U.S. Cl.
CPC ............. *C09K 8/54* (2013.01); *C09K 15/18* (2013.01); *C09K 15/26* (2013.01); *C23F 11/141* (2013.01); *C23F 11/149* (2013.01); *C23F 11/165* (2013.01); *C09K 2208/32* (2013.01)

(58) Field of Classification Search
CPC .......... C09K 8/54; C09K 15/18; C09K 15/26; C09K 2208/32; C23F 11/141; C23F 11/149; C23F 11/165
See application file for complete search history.

(56) References Cited

U.S. PATENT DOCUMENTS

| | | |
|---|---|---|
| 2,758,974 A | 8/1956 | Tierney |
| 2,947,703 A | 8/1960 | Larsonneur |
| 3,150,035 A | 9/1964 | Eddy |
| 3,199,989 A | 8/1965 | Buckman et al. |
| 5,607,623 A | 3/1997 | Benton et al. |
| 5,853,619 A | 12/1998 | Watson et al. |
| 6,395,225 B1 | 5/2002 | Pou et al. |
| 7,216,710 B2 | 5/2007 | Welton et al. |
| 9,317,635 B2 | 4/2016 | O'Connor et al. |
| 2013/0228095 A1 | 9/2013 | Miles et al. |

FOREIGN PATENT DOCUMENTS

| | | |
|---|---|---|
| CN | 106367762 A | 2/2017 |
| CN | 108060422 A | 5/2018 |
| GB | 1049044 | 11/1966 |
| RU | 2 658 518 C1 | 6/2018 |
| WO | WO 2014/178737 A1 | 11/2014 |
| WO | WO 2016/092010 A1 | 6/2016 |
| WO | WO 2016/092011 A1 | 6/2016 |

OTHER PUBLICATIONS

Extended European Search Report issued May 2, 2022 in European Patent Application 19855931.2, 8 pages.
International Search Report and Written Opinion issued on Nov. 20, 2019 in PCT/US2019/048380 filed on Aug. 27, 2019.
Combined Russian Office Action and Search Report issued Sep. 6, 2021 in Russian Patent Application No. 2021104462 (with English translation), 19 pages.

*Primary Examiner* — Sean E Conley
(74) *Attorney, Agent, or Firm* — Oblon, McClelland, Maier & Neustadt, L.L.P.

(57) ABSTRACT

A method of inhibiting corrosion of metal in contact with a corrosive mixture in an oil or gas field environment involving introducing a corrosion inhibitor composition into the corrosive mixture, the corrosion inhibitor composition including a nitrogen-containing compound having an alkyl amine group or an alkyl quaternary ammonium salt group, and at least one sulfur-containing compound selected from the group consisting of mercaptobenzothiazole, mercaptobenzoimidazole, a thioglycol compound, and a thiourea compound.

20 Claims, No Drawings

OIL AND GAS FIELD CORROSION INHIBITOR COMPOSITIONS

BACKGROUND OF THE INVENTION

Field of the Invention

The present invention relates to corrosion inhibitor compositions, as well as methods of making and methods of using the corrosion inhibitor compositions in oil and gas field environments.

DISCUSSION OF THE BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

It is known that many oil and gas producing formations yield hydrocarbon, brine, carbon dioxide ($CO_2$) and/or hydrogen sulfide ($H_2S$), which are very corrosive on metal tubing, pumps, casing and other production equipment. This is especially true of metal surfaces which are exposed to aqueous solutions containing such corrosive chemicals. Corrosion is much more severe in the oil/gas transporting pipelines where the mobile phase moves at high velocity and exerts high wall shear stress onto the surface of metal tubing. Conventional corrosion inhibitors function by adsorbing onto the metallic surface and forming a film. Such films, however, are not persistent under the aforementioned high shear stress conditions. In general, increased dosage of conventional corrosion inhibitors is required for treating such conditions.

While many corrosion inhibitor formulations are known, for example, WO2016092010A1, CN106367762, U.S. Pat. No. 3,150,035A, and GB1049044A, each incorporated herein by reference in its entirety, none have been demonstrated to work effectively under conditions common to oil and gas field settings such as under high shear stress conditions in concentrations at or below 100 ppm.

SUMMARY OF THE INVENTION

In view of the forgoing, there is a need for corrosion inhibitor compositions that can be used at low concentrations (e.g., 100 ppm or less) for preventing corrosion of metal in various oil or gas field environments, including harsh wall shear stress conditions common to oil/gas transport systems.

Accordingly, it is one object of the present invention to provide novel corrosion inhibitor compositions.

It is another object of the present disclosure to provide novel methods for making the corrosion inhibitor compositions.

It is another object of the present disclosure to provide novel methods of inhibiting corrosion of metal in contact with a corrosive mixture in an oil or gas field environment by introducing the corrosion inhibitor compositions.

These and other objects, which will become apparent during the following detailed description, have been achieved by the inventors' discovery that the combination of nitrogen-containing compounds and sulfur-containing compounds, or the use of nitrogen-containing compounds alone which have a high iodine value, provides a superior, and in some cases, a synergistic anticorrosion effect that enables the corrosion inhibitor compositions to maintain their effectiveness at relatively low concentrations under harsh conditions of high wall shear stress in oil or gas field environments.

Thus, the present invention provides:

(1) A method of inhibiting corrosion of metal in contact with a corrosive mixture in an oil or gas field environment, the method comprising:
introducing a corrosion inhibitor composition into the corrosive mixture, wherein the corrosion inhibitor composition comprises:
a nitrogen-containing compound having an alkyl amine group or an alkyl quaternary ammonium salt group; and
at least one sulfur-containing compound selected from the group consisting of mercaptobenzothiazole, mercaptobenzoimidazole, a thioglycol compound, and a thiourea compound.

(2) The method of (1), wherein the nitrogen-containing compound is at least one compound selected from the group consisting of an imidazoline compound, a fatty amide, an alkyl amine, a quaternary ammonium salt, an alkoxylated amine, an alkyl polyamine, and an amine oxide.

(3) The method of (1) or (2), wherein the nitrogen-containing compound is an imidazoline compound formed from a reaction between a fatty acid or an ester derivative thereof and an alkyl polyamine compound containing at least one ethylene diamine group.

(4) The method of (3), wherein the fatty acid is tall oil fatty acid, and wherein the alkyl polyamine compound is diethylenetriamine (DETA) or aminoethylethanolamine (AEEA).

(5) The method of (1) or (2), wherein the nitrogen-containing compound is a mixture of an imidazoline compound and a fatty amide, and wherein a weight percent of the imidazoline compound in the mixture is 60 to 90%.

(6) The method of (1) or (2), wherein the nitrogen-containing compound is an unsaturated fatty amine or a polyalkoxylated unsaturated fatty amine.

(7) The method of any one of (1) to (6), wherein the nitrogen-containing compound has an iodine value above 90.

(8) The method of any one of (1) to (7), wherein the nitrogen-containing compound has an iodine value above 120.

(9) The method of any one of (1) to (8), wherein the sulfur-containing compound is 2-mercaptobenzothiazole.

(10) The method of any one of (1) to (9), wherein a molar ratio (N:S) of the nitrogen-containing compound (N) to the sulfur-containing compound (S) is 0.125:1 to 50:1.

(11) The method of any one of (1) to (10), wherein a molar ratio (N:S) of the nitrogen-containing compound (N) to the sulfur-containing compound (S) is 1:1 to 10:1.

(12) The method of any one of (1) to (11), wherein a molar ratio (N:S) of the nitrogen-containing compound (N) to the sulfur-containing compound (S) is 2:1 to 5:1.

(13) The method of any one of (1) to (12), wherein the corrosion inhibitor composition further comprises an organic solvent.

(14) The method of any one of (1) to (13), wherein the corrosive mixture has a pH of 2 to 7.

(15) The method of any one of (1) to (14), wherein the corrosive mixture comprises carbon dioxide, hydrogen sulfide, or both.
(16) The method of any one of (1) to (15), wherein the corrosion inhibitor composition is introduced into the corrosive mixture at a concentration of 5 to 100 ppm.
(17) The method of any one of (1) to (16), wherein the corrosion inhibitor composition is introduced into the corrosive mixture during production and/or transportation of oil and/or gas.
(18) The method of any one of (1) to (17), wherein the metal in contact with the corrosive mixture is under a wall shear stress of 10 to 600 Pa.
(19) The method of any one of (1) to (18), wherein the metal in contact with the corrosive mixture is under a wall shear stress of 150 to 250 Pa.
(20) The method of any one of (1) to (19), wherein the corrosion inhibitor composition inhibits corrosion of the metal at a temperature of 20 to 90° C.
(21) The method of any one of (1) to (20), wherein the corrosive mixture comprises an aqueous phase having a brine concentration of 0.1 to 10% by weight relative to a total weight of the aqueous phase.
(22) The method of any one of (1) to (21), wherein the corrosive mixture is a multi-phase mixture comprising brine and oil with a brine to oil ratio (w/o) of 5:95 to 95:5 by volume.
(23) A corrosion inhibitor composition comprising:
a nitrogen-containing compound having an alkyl amine group or an alkyl quaternary ammonium salt group; and
at least one sulfur-containing compound selected from the group consisting of mercaptobenzothiazole, mercaptobenzoimidazole, a thioglycol compound, and a thiourea compound;
wherein a molar ratio (N:S) of the nitrogen-containing compound (N) to the sulfur-containing compound (S) is 1:1 to 10:1.
(24) The corrosion inhibitor composition of (23), wherein a molar ratio (N:S) of the nitrogen-containing compound (N) to the sulfur-containing compound (S) is 2:1 to 5:1.
(25) The corrosion inhibitor composition of (23) or (24), wherein the nitrogen-containing compound is at least one compound selected from the group consisting of an imidazoline compound, a fatty amide, an alkyl amine, a quaternary ammonium salt, an alkoxylated amine, an alkyl polyamine, and an amine oxide.
(26) The corrosion inhibitor composition of any one of (23) to (25), wherein:
the nitrogen-containing compound is an imidazoline compound formed from a reaction between a fatty acid or an ester derivative thereof and an alkyl polyamine compound containing at least one ethylene diamine group; and
the sulfur-containing compound is 2-mercaptobenzothiazole.
(27) The corrosion inhibitor composition of (26), wherein the fatty acid is tall oil fatty acid, and wherein the alkyl polyamine compound is diethylenetriamine (DETA) or aminoethylethanolamine (AEEA).
(28) The corrosion inhibitor composition of any one of (23) to (27), wherein the nitrogen-containing compound has an iodine value above 90.
(29) The corrosion inhibitor composition of any one of (23) to (28), wherein the nitrogen-containing compound has an iodine value above 120.
(30) A method of making the corrosion inhibitor composition of any one of (23) to (29), the method comprising:
mixing the nitrogen-containing compound with the sulfur-containing compound to form a mixture; and
vigorously agitating the mixture with at least one method selected from the group consisting of ultrasonication, microwave irradiation, high speed stirring, and heating until a uniform clear solution is reached.
(31) The method of (30), wherein:
when ultrasonication is employed, the mixture is ultrasonicated at a power of 100 to 1,000 W and at frequency of 20 to 100 kHz;
when microwave irradiation is employed, the mixture is microwave irradiated at a power of 500 to 2,000 W;
when high speed stirring is employed, the mixture is stirred at a stirring rate of 1,000 to 5,000 rpm; and
when heating is employed, the mixture is heated to a temperature of 50 to 95° C.
(32) A corrosion inhibitor, comprising:
an imidazoline compound with an iodine value above 120.
(33) The corrosion inhibitor of (32), wherein the imidazoline compound is formed from a reaction between a fatty acid or an ester derivative thereof and an alkyl polyamine compound containing at least one ethylene diamine group.
(34) The corrosion inhibitor of (33), wherein the fatty acid is tall oil fatty acid, and wherein the alkyl polyamine compound is diethylenetriamine (DETA) or aminoethylethanolamine (AEEA).
(35) A method of inhibiting corrosion of metal in contact with a corrosive mixture in an oil or gas field environment, the method comprising:
introducing the corrosion inhibitor of any one of (32) to (34) into the corrosive mixture.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 8 to 26 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a polyether group (i.e., polyoxyalkylene group) derived from oligomerization or polymerization of one or more alkylene oxides having 2 to 4 carbon atoms, and specifically includes polyoxyethylene (derived from ethylene oxide), polyoxypropylene (derived from propylene oxide), and polyoxybutylene (derived from butylene oxide), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26, preferably 8 to 22, and more preferably 12 to 18 carbon atoms. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), as well as unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Optionally substituted alkyl groups are also included in the definition of alkyl. As used herein, "optionally substituted" means that at least one hydrogen atom is replaced with a non-hydrogen group, provided that normal valencies are maintained and that the substitution results in a stable compound. Such optional substituents may include, but are not limited to, aryl, alkoxy, aryloxy, arylalkyloxy, aroyl, alkanoyl, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —$CONH_2$, —CONHalkyl, —CONHaryl, —CONHarylalkyl or cases where there are two substituents on one nitrogen), and the like. For example, ethanolamine is considered to be an alkyl amine compound in the present disclosure because it contains an amine group attached to an optionally substituted alkyl group (i.e., a primary amine bonded to a hydroxy-substituted ethyl group). Further, any alkyl and/or aryl groups present in these optional substituents may also optionally be substituted, for example the alkyl group of an alkylamino substituent may also be optionally substituted, as defined above.

As used herein the term "corrosion inhibitor" refers to a substance(s) that prevents or reduces the deterioration of a metal surface by oxidation or other chemical reaction. Corrosive substances that can cause corrosion, particularly of metal surfaces used during the production, recovery, transportation, storage and refining of hydrocarbons or various natural gases, include water with high salt contents, acidic inorganic compounds such as carbon dioxide ($CO_2$) or hydrogen sulfide ($H_2S$), natural organic acids, and microorganisms. Preferred corrosion inhibitor compositions of the present invention reduce, inhibit or prevent the destructive effect such substances have on various metal surfaces.

Corrosion Inhibitor Compositions

The present disclosure provides corrosion inhibitor compositions that include a combination of (N) nitrogen- and (S) sulfur-containing compounds, the combination of which provides a superior, and in some cases, a synergistic anti-corrosion effect that enables the corrosion inhibitor composition to be used in harsh conditions in oil or gas field environments, and while using lower quantities than previously thought possible in such circumstances. The corrosion inhibitor composition generally includes a nitrogen-containing compound having an alkyl amine group or an alkyl quaternary ammonium salt group, and at least one sulfur-containing compound selected from the group consisting of mercaptobenzothiazole, mercaptobenzoimidazole, a thioglycol compound, and a thiourea compound.

Alternatively, the present disclosure provides corrosion inhibitor compositions that include a nitrogen-containing compound having a high iodine value, and no sulfur-containing compound, and such nitrogen-containing compounds are surprisingly effective anti-corrosion agents.

(N) Nitrogen-Containing Compound

The nitrogen-containing compound of the present disclosure may be generally classified as a compound possessing at least one alkyl amine group or alkyl quaternary ammonium salt group (where the alkyl group may be optionally substituted). One or more amine groups may be present, such as one, two, three, four, five, or six amine groups, although as many as 20 amine groups may be present in some cases. The amine of the alkyl amine group may be a primary amine, a secondary amine, a tertiary amine, a quaternary ammonium group, including mixtures thereof when more than one amine is present. To meet the definition of a nitrogen-containing compound possessing at least one alkyl amine group or alkyl quaternary ammonium salt group, there must be at least one nitrogen atom bonded directly to an aliphatic carbon of an alkyl group, which includes optionally substituted alkyl groups. For example, diethylene triamine (DETA) is considered herein to possess an alkyl amine group because it has at least one nitrogen atom present that is bonded to an aliphatic carbon of an alkyl group, in this case a substituted alkyl group, more specifically an amino-substituted alkyl group. In addition to being directly bonded to an aliphatic carbon of an alkyl group, the nitrogen atom of the alkyl amine group may be directly bonded to any combination of alkyl, aryl, oxygen (N-oxide type compounds), or proton (—H) groups so long as normal valencies are maintained. For example, the nitrogen-containing compound may be a primary alkyl amine compound, a dialkyl secondary amine compound, a monoalkyl monoaryl secondary amine compound, a dialkyl tertiary amine compound, and so forth, including combinations thereof when more than one nitrogen atom is present, as well as quaternary ammonium salts thereof, and N-oxide variants thereof.

The alkyl amine group may be linear, branched, saturated or may contain sites of unsaturation. The site(s) of unsaturation may be cis-double bonds, trans-double bonds, or a combination. Preferably the nitrogen-containing compound contains at least one alkyl amine group that contains unsaturation (i.e., nitrogen substituted with an alkenyl substituent), including mono-, di-, tri-, oligo-, and poly-unsaturated alkenyl substituents. The alkyl group(s) of the alkyl amine group may contain anywhere from 1 to 26 carbon atoms, preferably 2 to 24 carbon atoms, preferably 4 to 22 carbon atoms, preferably 6 to 20 carbon atoms, preferably 8 to 18 carbon atoms per alkyl group. In some embodiments, the alkyl group of the alkyl amine group is a fatty alkyl group.

While the nitrogen-containing compound of the present disclosure may contain more than one fatty alkyl group (i.e., made up of hydrogen and anywhere from 8 to 26 carbon atoms), in preferred embodiments, one fatty alkyl group is present per nitrogen-containing compound. For example, when the nitrogen-containing compound contains a secondary dialkyl amine, the amine is preferably bonded to one fatty alkyl group and one (non-fatty) alkyl group having 1 to 7 carbon atoms (e.g., methyl, ethyl, propyl, isopropyl, butyl, isobutyl, sec-butyl, t-butyl, pentyl, isopentyl, neopentyl, hexyl, isohexyl, 3-methylpentyl, 3-methylbutyl, 1,3-dimethylbutyl, 2,2-dimethylbutyl, and 2,3-dimethylbutyl, heptyl).

Nitrogen-containing compound(s) acceptable for use in the disclosed corrosion inhibitor compositions may fall into the following classes: (i) an alkyl amine, (ii) an alkyl polyamine, (iii) an alkoxylated amine, (iv) an imidazoline compound, (v) a fatty amide, (vi) a quaternary ammonium salt, and (vii) an amine oxide.

(i) Alkyl amines that can be used herein as the nitrogen-containing compound are compounds containing primary, secondary, tertiary, monoalkyl tertiary amines, dialkyl tertiary amines, trialkyl tertiary amines, dialkylaryl tertiary amines, preferably compounds containing only a single amine functional group bonded to at least one alkyl substituent, with the remaining bonds (if any) to hydrogen. The one, two, or three alkyl groups may be independently linear, branched, saturated or unsaturated. In preferred embodiments, the alkyl amine contains an unsaturated alkyl group, preferably a mono-unsaturated alkyl group, more preferably a di- or ti-unsaturated alkyl group. In preferred embodiments, the alkyl amine is a fatty amine, that is, a compound having a long-chain alkyl group made up of hydrogen and anywhere from 8 to 26 carbon atoms, preferably 10 to 22 carbon atoms, preferably 12 to 20 carbon atoms, more preferably 16 to 18 carbon atoms, bonded to an amine functional group. In some embodiments, the alkyl amine is a tertiary amine having one fatty alkyl substituent and two lower alkyl (i.e., 1 to 7 carbon atoms) substituents. In some embodiments, the alkyl amine is a tertiary amine having two fatty alkyl substituents and one lower alkyl (i.e., 1 to 7 carbon atoms) substituent, for example didodecylmethylamine. Fatty amines used herein may be manufactured by subjecting a fatty acid, either a synthetic fatty acid or a naturally occurring fatty acid, to the Nitrile process followed by reduction (e.g., hydrogenation), which is known by those of ordinary skill in the art. Exemplary fatty acid starting materials that may be used to form the fatty amine include, for example, caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as naturally occurring fatty acid mixtures such as tall oil fatty acid and its derivatives (TOFA), coconut oil and its derivatives, tallow fatty acid and its derivatives (tallow), naphthenic acids and its derivatives, soya fatty acid and its derivatives (soya), and the like. Therefore, the fatty amines employed herein may also exist as a distribution or mixture of fatty amines when derived from mixtures of naturally occurring fatty acids. Exemplary fatty amines, include, but are not limited to, coco amine, stearyl amine, palmitoleylamine, oleylamine, oleyldimethylamine, tallow amine, tall oil fatty amine, laurylamine, linoleylamine, myristylamine, cetylamine, stearylamine, and soya amine, any of which may be optionally hydrogenated, partially hydrogenated, or non-hydrogenated. Preferably, the alkyl amine is an unsaturated fatty amine. In preferred embodiments, the alkyl amine is tallow amine (Farmin TD), didodecyl methyl amine (Farmin M2 2095), or distearyl methyl amine (Farmin M2 8095), each commercially available from Kao.

(ii) The nitrogen-containing compound may be an alkyl polyamine, that is, a compound containing two, three, four, or more nitrogen groups where at least one of the nitrogen atoms present is directly bonded to at least one alkyl substituent (including optionally substituted alkyl substituents), preferably all nitrogen atoms present are directly bonded to at least one alkyl substituent. The amine groups may be primary, secondary, or tertiary amines, and the alkyl substituent(s) may be linear, branched, saturated or unsaturated. While the alkyl polyamine may be cyclic, in preferred embodiments the alkyl amine is an acyclic compound. Suitable alkyl polyamines include, but are not limited to, alkyl diamines such as putrescine, cadaverine, and N-fatty amine diamines such as N-tallow propylene diamine, laurylamine dipropylenediamine, and N-tallow alkyltrimethylenediamine (sold as Duomeen T from AkzoNobel), alkyl triamines such as spermidine, 1,1,1-tris(aminomethyl)ethane, and N-fatty amine triamines such as laurylamine dipropylenediamine, alkyl tetraamines such as tris(2-aminoethyl) amine and spermine; and polyalkylene polyamines (e.g., polypropylene polyamines such as dipropylene triamine, tripropylene tetramine, tetrapropylene pentamine, pentapropylene hexamine, hexapropylene heptamine, and higher homologues, and polybutylene polyamines such as dibutylene triamine, tributylene tetramine, tetrabutylene pentamine, pentabutylene hexamine, hexabutylene heptamine, and higher homologues), each of which may be linear, branched, and dendrimeric polyalkylene polyamines. In preferred embodiments, the alkyl polyamine is tallow alkyltrimethylenediamines, for example Diamin T, commercially available from Kao.

(iii) The nitrogen-containing compound may be an alkoxylated amine, that is a polyoxyalkylene ether of an alkyl amine. Such alkoxylated amines may be based on a primary alkyl amine containing one or more polyoxyalkylene ether groups, or a secondary alkyl amine containing mono-polyoxyalkylene ether groups. The (poly)oxyalkylene-type alkoxy groups may include polyoxyethylene (—O—(CH$_2$—CH$_2$—O)$_m$—R), polyoxypropylene (—O—(CH$_2$—CH(CH)O)$_m$—R), and polyoxybutylene (—O—(CH$_2$—CH(CH$_2$CH$_3$)—O)$_m$—R) groups having up to 100 repeating units, i.e., m is from 1 to 100, and wherein R is H or a C$_1$ to C$_3$ alkyl group (e.g., methyl, ethyl, n-propyl, isopropyl). Any primary or secondary alkyl amine may be (poly)alkoxylated for use as the alkoxylated amine herein. In preferred embodiments, the alkoxylated alkyl amine is based on a fatty (mono)amine (formula I), an N-fatty amine diamine (formula II), or an N-fatty amine triamine (formula IIIa or IIIb):

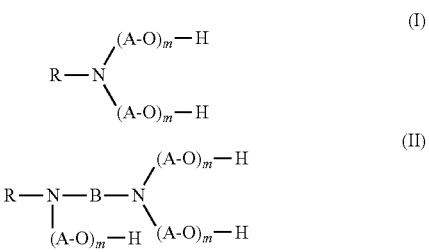

-continued

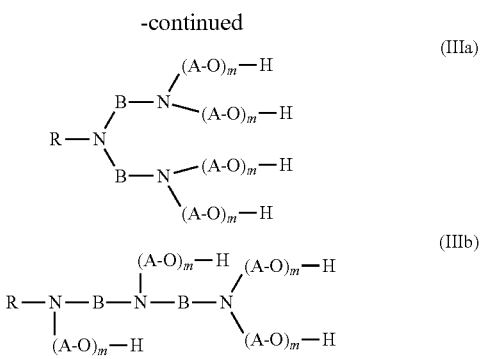

wherein:
R is an alkyl group made up of hydrogen and anywhere from 8 to 26 carbon atoms, preferably 10 to 22 carbon atoms, preferably 12 to 20 carbon atoms, more preferably 16 to 18 carbon atoms (e.g., octadecyl), including mixtures thereof, and more preferably contains at least one site of unsaturation, more preferably at least two sites of unsaturation;
A is an ethylene group (—$CH_2CH_2$—), a propylene group (—$CH_2CH(CH_3)$—), or a butylene group (—$CH_2CH(CH_2CH_3)$—), preferably an ethylene group;
B is an ethylene spacer (—$CH_2CH_2$—) or a n-propylene spacer (—$CH_2CH_2CH_2$—); and each m is independently a positive integer from 1 to 100, preferably 1 to 80, more preferably 1 to 60, more preferably 1 to 50, more preferably 1 to 40, more preferably 1 to 30, more preferably 1 to 20, more preferably 1 to 10, more preferably 1 to 5.

In more preferred embodiments, R is derived from naturally occurring fatty acid mixtures such as tall oil fatty acid and its derivatives (TOFA), coconut oil and its derivatives, tallow fatty acid and its derivatives (tallow), naphthenic acids and its derivatives, soya fatty acid and its derivatives (soya), and the like. Therefore, in preferred embodiments, the nitrogen-containing compound is or comprises a coconut fatty amine alkoxylate, a stearyl amine alkoxylate, a palmitoleylamine alkoxylate, a oleylamine alkoxylate, a tallow amine alkoxylate, a tall oil fatty amine alkoxylate, a laurylamine alkoxylate, a myristylamine alkoxylate, a cetylamine alkoxylate, a stearylamine alkoxylate, a linoleyl fatty amine alkoxylate, a soya fatty amine alkoxylate, as well as alkoxylated ethylene diamine variants thereof (formula II, where B is an ethylene spacer), alkoxylated trimethylene diamine variants thereof (formula II, where B is an n-propylene spacer, for example, tallow alkyltrimethylene diamine alkoxylates), alkoxylated diethylene triamine variants thereof (formula IIIa or IIIb, where B is an ethylene spacer), and alkoxylated dipropylene triamine variants thereof (formula IIIa or IIIb, where B is an n-propylene spacer). More preferably, the alkoxylated amine is a polyalkoxylated tallow amine. Even more preferably, the nitrogen-containing compound is or comprises a coconut fatty amine ethoxylate, a stearyl amine ethoxylate, a palmitoleylamine ethoxylate, a oleylamine ethoxylate, a tallow fatty amine ethoxylate, a tall oil fatty amine ethoxylate, a laurylamine ethoxylate, a myristylamine ethoxylate, a cetylamine ethoxylate, a stearylamine ethoxylate, a linoleyl fatty amine ethoxylate, a soya fatty amine ethoxylate, as well as ethoxylated ethylene diamine variants thereof (formula II, where B is an ethylene spacer and A is an ethylene group), ethoxylated trimethylene diamine variants thereof (formula II, where B is an n-propylene spacer and A is an ethylene group, for example, tallow alkyltrimethylene diamine ethoxylates), ethoxylated diethylene triamine variants thereof (formula IIIa or IIIb, where B is an ethylene spacer and A is an ethylene group), and ethoxylated dipropylene triamine variants thereof (formula IIIa or IIIb, where B is an n-propylene spacer and A is an ethylene group). More preferably, the alkoxylated amine is a polyethoxylated tallow amine. Yet even more preferably, the nitrogen-containing compound is or comprises any of the above ethoxylates mentioned above using 2 to 20 EO molar equivalents, preferably 3 to 15 EO molar equivalents, preferably 4 to 10 EO molar equivalents, preferably 5 to 8 EO molar equivalents per moles of amine starting material. Non-limiting examples of the alkoxylated amine employed herein includes, but is not limited to, Amiet 102, Amiet 105, Amiet 302 (ethoxylated octadecyl amine), Amiet 320, Amiet 502 (ethoxylated tallow amine), Amiet 505, and Amiet 515 (each available from Kao).

(iv) The nitrogen-containing compound may be an imidazoline compound. In some embodiments, the imidazoline compound is a cyclization reaction product from a reaction between (a) a fatty acid or an ester derivative thereof, for example a $C_1$ to $C_{12}$ alkyl ester (e.g., methyl, ethyl, etc.) of a fatty acid or a glycerol ester of a fatty acid, and (b) an alkyl polyamine compound which contains at least one ethylene diamine group (i.e., an alkyl polyamine compound containing at least one vicinal diamine). For reactant (a), any previously described fatty acid or naturally occurring mixture of fatty acids or their respective ester derivatives, can be used. In preferred embodiments, the imidazoline compound is prepared from tall oil fatty acid, coconut oil fatty acid, tallow fatty acid, soya fatty acid, and oleic acid. In preferred embodiments, the imidazoline compound is formed from tall oil fatty acid as component (a). For (b), any previously described alkyl polyamine may be used, as long as at least one ethylene diamine group is present that is capable of reacting with a carboxylic acid group to form an imidazoline structure. In some embodiments, the alkyl polyamine compound may be a polyethylene polyamine compound of the general formula IV:

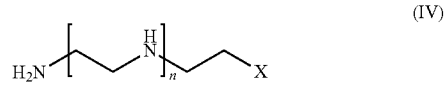

wherein n is a positive integer from 1 to 10, preferably from 1 to 8, preferably from 2 to 6, and X is —$NH_2$ or —OH. Suitable examples include, but are not limited to, tetraethylenepentamine (TEPA), diethylenetriamine (DETA), triethylenetetramine (TETA), aminoethylethanolamine (AEEA), pentaethylene hexamine (PEHA), hexaethylene heptamine (HEHA), as well as higher homologs, as well as mixtures of polyethylene polyamines, including, but not limited to, Ethyleneamine E-100, a commercially available mixture of polyethylene polyamines comprising TEPA, PEHA, and HEHA (Huntsman Corporation); Heavy Polyamine X (HPA-X), a commercially available mixture of linear, branched, and cyclic polyethylene polyamines comprising TETA, TEPA, PEHA, and higher polyethylene polyamines from Dow Chemical Company; and Amix 1000 (CAS #68910-054), a commercially available mixture of roughly equivalent amounts of aminoethylethanolamine, triethylene tetramine (TETA), aminoethylpiperazine, and high boiling polyamines from BASF Corporation. In preferred embodiments, the alkyl polyamine (b) used to make the imidazoline compound (iv) herein is diethylenetriamine (DETA) or aminoethylethanolamine (AEEA).

The produced imidazoline compound formed from the reaction between equal moles of (a) the fatty acid or an ester derivative and (b) the alkyl polyamine compound may be preferably represented by formula V:

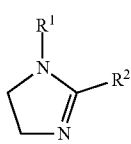

(V)

wherein:
$R^1$ is —$(CH_2CH_2NH)_n$—$CH_2CH_2X$);
$R^2$ is a fatty alkyl group made up of hydrogen and anywhere from 8 to 26 carbon atoms, preferably 10 to 22 carbon atoms, preferably 12 to 20 carbon atoms, more preferably 16 to 18 carbon atoms, including mixtures thereof, and more preferably is selected from linear alkyl, mono-unsaturated alkenyl, di-unsaturated alkenyl, tri-unsaturated alkenyl, and oligo-unsaturated alkenyl;
X is —$NH_2$ or —OH; and
n is 0 to 4.

In some embodiments, when the alkyl polyamine compound contains two or more ethylene diamine groups capable of reacting with a carboxylic acid to form an imidazoline product, different molar ratios of fatty acid to alkyl polyamine may be employed, and the resulting product may contain one or more imidazoline structures per product molecule. A wide range of molar ratios of (a) and (b) may be employed to form the imidazoline compounds herein, however, in preferred embodiments the molar ratio of (a) to (b) is 1:5 to 5:1, preferably 1:1 to 5:1, more preferably 2:1 to 4:1, or any integers or non-integers in between. Imidazoline compounds that may be used in the corrosion inhibitor compositions herein as the nitrogen-containing compound may include, 1:1 (molar ratio) TOFA/DETA imidazoline, 2:1 TOFA/DETA imidazoline, 1:1 TOFA/TETA imidazoline, 2:1 TOFA/TETA imidazoline, 2:1 TOFA-TETA bis-imidazoline, 1:1 TOFA/TEPA imidazoline, 2:1 TOFA/TEPA imidazoline, 2:1 TOFA/TEPA bis-imidazoline, 3:1 TOFA/TEPA bis-imidazoline, 1:1 TOFA/AEEA imidazoline, 2:1 TOFA/AEEA imidazoline, 1:1 TOFA/polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, 1:1 Soya/TEPA imidazoline, 2:1 Soya/TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/DETA imidazoline, 1:1 Tallow/TETA imidazoline, 2:1 Tallow/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AEEA imidazoline, 2:1 Tallow/AEEA imidazoline, 1:1 Tallow/polyamine imidazoline, 2:1 Tallow/polyamine imidazoline, 2:1 Tallow/polyamine bis-imidazoline, and 3:1 Tallow/TEPA polyamine bis-imidazoline. In preferred embodiments, the imidazoline compound is 1:1 TOFA-DETA imidazoline or 1:1 TOFA-AEEA imidazoline.

(v) The nitrogen-containing compound may be a fatty amide. Like the imidazoline compounds described above, in some embodiments, the fatty amide is an acyclic reaction product of a reaction between (a) a fatty acid or an ester derivative thereof, for example a $C_1$ to $C_{12}$ alkyl ester (e.g., methyl, ethyl, etc.) of a fatty acid or a glycerol ester of a fatty acid, and (b) an alkyl polyamine compound. However, unlike in the case of imidazoline-containing products, the reaction between (a) and (b) stops at the amide forming stage and does not undergo subsequent intramolecular cyclization/condensation via a pendent vicinal amine moiety. For reactant (a), any previously described fatty acid or naturally occurring mixture of fatty acids or their respective ester derivatives, can be used. In preferred embodiments, the fatty amide is prepared from tall oil fatty acid, coconut oil fatty acid, tallow fatty acid, soya fatty acid, and oleic acid. In preferred embodiments, the fatty amide is formed from tall oil fatty acid as component (a). For (b), any previously described alkyl polyamine may be used. For example, the alkyl polyamine compound may have the general formula IV as recited previously, and is more preferably selected from one or more of tetraethylenepentamine (TEPA), diethylenetriamine (DETA), triethylenetetramine (TETA), aminoethylethanolamine (AEEA), pentaethylene hexamine (PEHA), hexaethylene heptamine (HEHA), as well as higher homologs. In preferred embodiments, the alkyl polyamine employed herein to form the fatty amide is diethylenetriamine (DETA) or aminoethylethanolamine (AEEA).

The resulting fatty amide product formed from the reaction between equal moles of (a) the fatty acid or an ester derivative and (b) the alkyl polyamine compound may be preferably represented by formula VI:

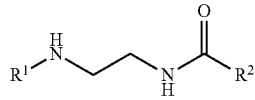

(VI)

wherein:
$R^1$ is —$(CH_2CH_2NH)_n$—$CH_2CH_2X$);
$R^2$ is a fatty alkyl group made up of hydrogen and anywhere from 8 to 26 carbon atoms, preferably 10 to 22 carbon atoms, preferably 12 to 20 carbon atoms, more preferably 16 to 18 carbon atoms, including mixtures thereof, and more preferably is selected from linear alkyl, mono-unsaturated alkenyl, di-unsaturated alkenyl, tri-unsaturated alkenyl, and oligo-unsaturated alkyl;
X is —$NH_2$ or —OH; and
n is 0 to 4.

In some embodiments, different molar ratios of fatty acid to alkyl polyamine may be employed, and the resulting product may contain one or more amide structures per product molecule. A wide range of molar ratios of (a) and (b) may be employed to form the fatty amides herein, however, in preferred embodiments the molar ratio of (a) to (b) is 1:1 to 5:1, preferably 2:1 to 4:1, or any integers or non-integers in between. For example, fatty amide reaction products produced from the following mixtures may be used in the corrosion inhibitor compositions herein: 1:1 (molar ratio) TOFA/DETA amide, 2:1 TOFA/DETA amide, 1:1 TOFA/

TETA amide, 2:1 TOFA/TETA amide, 2:1 TOFA/TETA bis-amide, 1:1 TOFA/TEPA amide, 2:1 TOFA/TEPA amide, 2:1 TOFA/TEPA bis-amide, 3:1 TOFA/TEPA bis-amide, 1:1 TOFA/AEEA amide, 2:1 TOFA/AEEA amide, 1:1 TOFA/polyamine amide, 2:1 TOFA/polyamine amide, 2:1 TOFA/polyamine bis-amide, 3:1 TOFA/TEPA polyamine bis-amide, 1:1 Soya/DETA amide, 2:1 Soya-DETA amide, 1:1 Soya/TETA amide, 2:1 Soya/TETA amide, 2:1 Soya/TETA bis-amide, 1:1 Soya/TEPA amide, 2:1 Soya/TEPA amide, 2:1 Soya-TEPA bis-amide, 3:1 TOFA/TEPA bis-amide, 1:1 Soya/AEEA amide, 2:1 Soya/AEEA amide, 1:1 Soya/polyamine amide, 2:1 Soya/polyamine amide, 2:1 Soya/polyamine bis-amide, 1:1 Tallow/DETA amide, 2:1 Tallow/DETA amide, 1:1 Tallow/TETA amide, 2:1 Tallow/TETA amide, 2:1 Tallow/TETA bis-amide, 1:1 Tallow/TEPA amide, 2:1 Tallow/TEPA amide, 2:1 Tallow/TEPA bis-amide, 3:1 Tallow/TEPA bis-amide, 1:1 Tallow/AEEA amide, 2:1 Tallow/AEEA amide, 1:1 Tallow/polyamine amide, 2:1 Tallow/polyamine amide, 2:1 Tallow/polyamine bis-amide, and 3:1 Tallow/TEPA polyamine bis-amide. In preferred embodiments, the fatty amide is formed from 1:1 TOFA-DETA or 1:1 TOFA-AEEA.

Other acceptable fatty amides which may be used herein include, but are not limited to, cocoamide DEA, cocamide MEA, cocamide MIPA, cocamidopropylamine oxide, PEG-6 cocamide, PEG-4 rapeseedamide, stearamidopropyldimethylamine, stearamindopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, arachidamidoethyldimethylamine, and mixtures thereof.

(vi) Quaternary ammonium salts may also be included in the corrosion inhibitor compositions of the present disclosure. Suitable quaternary ammonium salts include, but are not limited to, alkyl, hydroxyalkyl, alkylaryl, arylalkyl or arylamine quaternary salts, for example, those having the formula $[N^+R^3R^4R^5R^6][X^-]$ wherein $R^3$, $R^4$, $R^5$, and $R^6$ each independently contain 1 to 26 carbon atoms, and X is a halide (e.g., Cl, Br, I), a sulfate, carbonate, or bicarbonate. Preferably, $R^3$, $R^4$, $R^5$, and $R^6$ are each independently selected from the group consisting of alkyl (e.g., $C_1$ to $C_{26}$ alkyl), hydroxyalkyl (e.g., $C_1$ to $C_{18}$ hydroxyalkyl), and arylalkyl (e.g., benzyl). In preferred embodiments, at least one of, and more preferably one of $R^3$, $R^4$, $R^5$, and $R^6$ is a fatty alkyl group, that is, a linear alkyl group made up of hydrogen and anywhere from 8 to 26 carbon atoms, preferably 10 to 22 carbon atoms, preferably 12 to 20 carbon atoms, more preferably 16 to 18 carbon atoms, including mixtures thereof, and more preferably is selected from linear alkyl, mono-unsaturated alkenyl, di-unsaturated alkenyl, ti-unsaturated alkenyl, and oligo-unsaturated alkenyl. In such embodiments, the quaternary ammonium salt may be derived from alkylation of a fatty amine compound, and the quaternary ammonium salt may be characterized as a trialkyl fatty alkyl quaternary ammonium salt (e.g., trimethyl fatty alkyl ammonium chloride), an alkyl di-fatty alkyl benzyl ammonium salt (e.g., a di-fatty alkyl methylbenzylammonium chloride), or a benzalconium ammonium salt (e.g., a fatty alkyl dimethylbenzylammonium chloride). In preferred embodiments, the quaternary ammonium salt is derived from unsaturated fatty amines or a mixture containing unsaturated fatty amines, which includes for example palmitoleylamine, oleylamine, tallow amine, tall oil fatty acid amine, linoleylamine, soya amine, and the like.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, trialkyl benzyl quaternary ammonium compounds (e.g., benzyltrimethyl ammonium chloride, benzyltriethyl ammonium chloride), phenyltrimethyl ammonium chloride, phenyltriethyl ammonium chloride, monomethyl dialkyl benzyl quaternary ammonium compounds (e.g., Sanisol D24P, available from Kao), fatty alkyl benzyl dimethyl ammonium compounds (e.g., cetyl benzyldimethyl ammonium chloride, octyldimethylbenzyl ammonium chloride, decyldimethylbenzyl ammonium chloride, stearyldimethylbenzylammonium chloride), fatty alkyl trialkyl ammonium compounds (e.g., cetyltrimethylammonium chloride, behenyltrimethylammonium chloride, behentrimonium methosulfate, octyltrimethylammonium chloride, dodecyltrimethylammonium chloride, hexadecyl trimethyl ammonium chloride, tallowtrimethylammonium chloride, cocotrimethylammonium chloride, PEG-2-oleammonium chloride, Quartamin 86W (stearyl trimethyl ammonium chloride, available from Kao)), di-fatty alkyl dimethyl ammonium compounds (e.g., distearyldimethylammonium chloride, didodecyldimethylammonium chloride, dioctadecyldimethylammonium chloride, dihydrogenated tallow dimethyl ammonium chloride (for example Arquad 2HT-75, available from Akzo Nobel), and the like, as well as the corresponding bromides, iodides, sulfates, carbonates, and bicarbonates thereof.

Alternatively, the quaternary ammonium compound may be an ester quat based on a quaternary ethanolamine structure (e.g., methyltriethanolamine, dimethyldiethanolamine, dimethyl benzylethanolamine, and the like) or an alkoxylated variant thereof. In preferred embodiments, the quaternary ammonium salt is a mono- or di-ester formed from an esterification reaction between an ethanolamine group of a quaternary ammonium salt and one or more fatty acids or a mixture of fatty acids. While the ester quat can be made using any fatty acid mentioned herein, preferably the ester quat includes at least one unsaturated fatty acid, and more preferably is a mixture of fatty acids derived from natural sources that includes an unsaturated fatty acid, for example, tall oil fatty acid, tallow fatty acid, and soya fatty acid. Specific example of ester quats that may be included in the corrosion inhibitor compositions of the present disclosure include, but are not limited to, mono((Z)—N-benzyl-N,N-dimethyl-2-(oleoyloxy)ethanaminium) chloride, (Z)—N-benzyl-N,N-dimethyl-2-(2-(oleoyloxy)ethoxy)
ethanaminium chloride, N-benzyl-N,N-dimethyl-2-((9Z,12Z)-octadeca-9,12-dienoyloxy)ethanaminium chloride, N-benzyl-N,N-dimethyl-2-((9Z,12Z,15Z)-octadeca-9,12,15-trienoyloxy)ethanaminium chloride, N-benzyl-N,N-dimethyl-2-(palmitoyloxy)ethanaminium chloride, N-benzyl-N,N-dimethyl-2-(2-(palmitoyloxy)ethoxy)ethanaminium
chloride, mono((Z)—N,N,N-trimethyl-2-(oleoyloxy)ethanaminium)dichloride, (Z)—N,N,N-trimethyl-2-(2-(oleoyloxy)ethoxy)ethanaminium chloride, mono((Z)-2,3-dihydroxy-N,N-dimethyl-N-(2-(oleoyloxy)ethyl)propan-1-aminium)dichloride, (Z)-2,3-dihydroxy-N,N-dimethyl-N-(2-(2-oleoyloxy)ethoxy)ethyl)propan-1-aminium chloride, as well as the corresponding bromides, methosulfates, and ethosulfates thereof.

(vii) The nitrogen-containing compound may also be an amine oxide. The amine oxide may be an N→O oxidized form of any previously mention tertiary amine, in particular, a tertiary amine containing at least one fatty group. The amine oxide may be an amine oxide of a monoalkyl tertiary amine, a dialkyl tertiary amine, a trialkyl tertiary amine, a dialkylaryl tertiary amine. In some embodiments, the amine oxide is a N→O variant of a tertiary amine having one fatty alkyl substituent and two lower alkyl (i.e., 1 to 7 carbon atoms) substituents, for example, dodecyldimethylamine oxide (lauryldimethylamine oxide, commercially available as Amphitol 20N from Kao) and oleyldimethylamine oxide. In some embodiments, the amine oxide is a N→O variant of a tertiary amine having two fatty alkyl substituents and one lower alkyl (i.e., 1 to 7 carbon atoms) substituent, for example didodecylmethylamine.

In some embodiments, the corrosion inhibitor compositions may be formulated with mixtures of two or more classes (i)-(vii) of the nitrogen-containing compound(s), i.e., mixtures of at least two selected from the group consisting of an alkyl amine, an alkyl polyamine, an alkoxylated amine, an imidazoline compound, a fatty amide, a quaternary ammonium salt, and an amine oxide. In preferred embodiments, the corrosion inhibitor composition includes a mixture of two classes of nitrogen-containing compounds (i.e., first and second nitrogen-containing compounds). In such cases, the ratio of the first nitrogen-containing compound to the second nitrogen-containing compound may range from 1:1 to 10:1, preferably from 2:1 to 9:1, preferably from 3:1 to 8:1, preferably from 4:1 to 7:1, preferably from 5:1 to 6:1. Preferred mixtures include (iv) an imidazoline compound and (v) a fatty amide, each a reaction product between (a) a fatty acid or an ester derivative thereof, for example a $C_1$ to $C_{12}$ alkyl ester (e.g., methyl, ethyl, etc.) of a fatty acid, and (b) an alkyl polyamine compound which contains at least one ethylene diamine group (i.e., an alkyl polyamine compound containing at least one vicinal diamine), for example the alkyl polyamine compounds of formula IV. In preferred embodiments, both the imidazoline compound and the fatty amide are formed from the reaction between 1:1 TOFA-DETA or 1:1 TOFA-AEEA. In preferred embodiments, when a mixture of an imidazoline compound and a fatty amide is employed as the nitrogen-containing compound, a weight percent of the imidazoline compound in the mixture is 60 to 90%, preferably 65 to 85%, preferably 66 to 80%, preferably 70 to 75%, relative to a total weight of the mixture. In preferred embodiments, higher proportions of imidazoline compound (e.g., 75 to 90 wt. %, preferably 80 to 85 wt. % imidazoline compound) are used, resulting in advantageous corrosion inhibition (CI) ratios.

The iodine value (IV) is the mass of iodine in grams that is consumed by 100 grams of a chemical substance. Iodine values are often used to determine the amount of unsaturation in fatty acids. This unsaturation (in the form of double bonds) reacts with iodine, and thus the higher the iodine number, the more C=C bonds are present in the compound of interest. In preferred embodiments, the nitrogen-containing compound(s) employed herein has an iodine value above 90, preferably above 95, preferably above 100, preferably above 105, preferably above 110, preferably above 115, preferably above 120, preferably above 125, preferably above 130, preferably above 135, preferably above 140, and up to 160, or up to 155, or up to 150. More preferably, the nitrogen-containing compound(s) is (iv) an imidazoline compound or a mixture of (iv) an imidazoline compound and (v) a fatty amide having an iodine value above 120, preferably at or above 130. Iodine values may be measured using a modified Wijs protocol, for example AOCS Official Method Tg 2a-64 in the case of amines.

It has been surprisingly found that the use of a nitrogen-containing compound, in particular an imidazoline compound or a mixture of an imidazoline compound and a fatty amide, having high iodine values (i.e., above 90, preferably above 120, preferably equal to or above 130) provides corrosion inhibitor compositions with improved anti-corrosion properties. This effect is surprising since many saturated imidazoline compounds (or imidazoline compounds having low IV numbers e.g., less than 90) have well-known anti-corrosion properties, are commonly employed in the art, and such a trend has not been identified. Furthermore, this unexpected effect of increased corrosion resistance with increasing iodine values has been found herein to be magnified under increasingly harsh conditions, such as conditions resulting in high wall shear stress as will be discussed later. In fact, the use of a nitrogen-containing compound alone, such as (iv) an imidazoline compound or (iv/v) imidazoline compound/fatty amide mixture (e.g., 1:1 TOFA-DETA or 1:1 TOFA-AEEA imidazoline or imidazoline compound/fatty amide), having an iodine value above 120, preferably above 125, preferably above 130, preferably above 135, preferably above 140, without inclusion of a sulfur-containing compound, unexpectedly provides a corrosion inhibition effect similar to those compositions that have a combination of a nitrogen-containing compound and a sulfur-containing compound. Therefore, in some embodiments, the corrosion inhibitor compositions of the present disclosure contain such imidazoline compounds or imidazoline compound/fatty amide mixtures alone, and are substantially free of the sulfur-containing compounds discussed hereinafter. In other words, the use of the sulfur-containing compounds becomes increasingly optional with increasing IV values of the nitrogen-containing compound, and specifically when a nitrogen-containing compound is employed having an IV above 120, or above 130.

(S) Sulfur-Containing Compound

The corrosion inhibitor compositions of the present disclosure typically include at least one sulfur-containing compound selected from the group consisting of mercaptobenzothiazole, mercaptobenzoimidazole, a thioglycol compound, and a thiourea compound.

The thioglycol compound may be 2-mercaptoethanol, an alkyl thioglycol, a thioglycol alkoxylate, or a thiodiglycol alkoxylate. In some embodiments, the thioglycol compound is of formula VII:

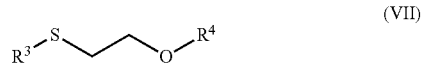

(VII)

wherein:
$R^3$ is a hydrogen, an optionally substituted alkyl group having 1 to 22 carbon atoms (preferably 1 to 16 carbon atoms, preferably 2 to 8 carbon atoms), or -(A-O)$_m$—H;
$R^4$ is a hydrogen or -(A-O)$_m$—H;
A is an ethylene group (—CH$_2$CH$_2$—), a propylene group (—CH$_2$CH(CH$_3$)—), or a butylene group (—CH$_2$CH(CH$_2$CH$_3$)—), preferably an ethylene group; and
m is a positive integer from 1 to 100, preferably 2 to 80, preferably 4 to 60, preferably 6 to 50, preferably 8 to 40, preferably 10 to 30, preferably 15 to 20.

Exemplary thioglycol compounds include, but are not limited to, 2-mercaptoethanol, 2-(methylthio)ethanol, 2-(ethylthio)ethanol, thioglycol ethoxylate, thioglycol propoxylated, thioglycol butoxylate, thiodiglycol ethoxylated, thiodiglycol propoxylated, thiodiglycol butoxylated.

In preferred embodiments, the thioglycol compound is 2-mercaptoethanol (where $R^3$ and $R^4$ are hydrogen).

The thiourea compound may be of the formula VIII

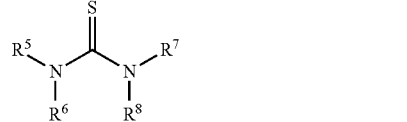

(VIII)

wherein:

$R^1$, $R^6$, $R^7$, and $R^8$ are each independently a hydrogen, an optionally substituted alkyl group having 1 to 22 carbon atoms (preferably 2 to 16 carbon atoms, preferably 4 to 8 carbon atoms), an optionally substituted aryl group; or wherein $R^5$ and $R^7$ are as described above and $R^6$ and $R^8$, together with the nitrogen atoms to which they are attached, form a 5- or 6-membered ring.

Examples of the thiourea compound that may be included in the corrosion inhibitor compositions herein, include, but are not limited to, thiourea, N-methylthiourea, N,N'-dimethylthiourea, tetramethylthiourea. N-ethylthiourea, N,N-diethylthiourea, tetraethylthiourea, N-propylthiourea, N,N'-dipropylthiourea, N-butylthiourea, N,N'-dibutylthiourea, imidazolidine-2-thione, and tetrahydropyrimidine-2(1H)-thione.

The corrosion inhibitor compositions may be formulated with a mixture of two or more sulfur-containing compounds, for example as a mixture of a first and second sulfur-containing compounds in a molar ratio of 10:1 to 1:10, preferably 8:1 to 1:8, preferably 6:1 to 1:6, preferably 4:1 to 1:4, preferably 2:1 to 1:2, preferably about 1:1.

In preferred embodiments, the sulfur-containing compound is 2-mercaptobenzothiazole (MBT).

The combination of at least one nitrogen-containing compound selected from the group consisting of an imidazoline compound, a quaternary ammonium salt, an alkoxylated amine, an alkyl polyamine and an amine oxide, and mercaptobenzothiazole is preferred, and a combination of at least one nitrogen-containing compound selected from the group consisting of an imidazoline compound and an alkyl polyamine, and mercaptobenzothiazole is more preferred.

The preferred combination of specific compounds described in the examples:

<Ex. 1-5> The combination of imidazoline compound (obtained from reaction between tall oil fatty acid and diethylenetriamine) and 2-MBT (2-mercaptobenzothiazole)

<Ex. 7> The combination of imidazoline compound and 2-mercaptobenzimidazole.

<Ex. 8> The combination of Amiet 502 (ethoxylated tallow amine) and 2-MBT.

<Ex. 9> The combination of Amiet 302 (ethoxylated octadecyl amine) and 2-MBT.

<Ex. 10> The combination of Farmin TD (tallow amine) and 2-MBT.

<Ex. 19> The combination of Farmin M2 2095 (didodecyl methyl amine) and 2-MBT.

<Ex. 21> The combination of Diamin T (tallow alkyltrimethylenediamine) and 2-MBT.

<Ex. 23> The combination of Amphitol 20N (lauryldimethylamine oxide) and 2-MBT.

<Ex. 25> The combination of Quartamin 86W (stearyl trimethyl ammonium chloride) and 2-MBT.

<Ex. 27> The combination of Sanisol D24P (monomethyl dialkyl benzyl quaternary ammonium compound) and 2-MBT.

The combination of the nitrogen-containing compound (N) and the sulfur-containing compound (S) provides a superior, and in some cases, a synergistic anticorrosion effect (see for example Examples 2, 11, and 17 in Table 1) that enables the corrosion inhibitor compositions to be used under high temperature, high pressure, high shear stress, and highly corrosive conditions. Further, even when deployed in such harsh environments, the corrosion inhibitor compositions herein remain effective at unexpectedly low concentrations.

While various molar ratios (N:S) of the nitrogen-containing compound (N) to the sulfur-containing compound (S) may be employed to achieve the desired anti-corrosion effect, typical N:S molar ratios range from 0.125:1, preferably from 0.2:1, preferably from 0.5:1, preferably from 1:1, preferably from 1.2:1, preferably from 1.3:1, preferably from 1.4:1, preferably from 1.5:1, preferably from 2:1, preferably from 3:1, and up to 50:1, preferably up to 40:1, preferably up to 30:1, preferably up to 20:1, preferably up to 10:1, preferably up to 5:1, preferably up to 4:1. In embodiments where the nitrogen-containing compound (N) is an imidazoline compound or a mixture of an imidazoline compound/fatty amide, and the sulfur containing component is 2-mercaptobenzothiazole, more advantageous anti-corrosion effects are obtained using a N:S molar ratio of at least 1:1, preferably at least 1.2:1, preferably at least 1.3:1, preferably at least 1.4:1, preferably at least 1.5:1, preferably at least 2:1, preferably at least 3:1, and up to 50:1, preferably up to 20:1, preferably up to 10:1, preferably up to 5:1, preferably up to 4:1.

Organic Solvent

The corrosion inhibitor composition may also optionally include an organic solvent to fully dissolve all components and form a uniform solution, as needed. In preferred embodiments, the corrosion inhibitor compositions are substantially free of organic solvent. However, when present, organic solvents may be added in amounts of at least about 40 wt. %, preferably at least about 45 wt. %, more preferably at least about 46 wt. %, even more preferably at least about 48 wt. %, yet even more preferably at least about 50 wt. %, and up to about 70 wt. %, preferably up to about 68 wt. %, more preferably up to about 66 wt. %, even more preferably up to about 62 wt. %, yet even more preferably up to about 60 wt. %, based on a total weight of the corrosion inhibitor compositions. The organic solvent may be chosen from, for example, a $C_1$ to $C_4$ lower alkanol, for example, methanol, ethanol, isopropanol, butanol; chiral alkanols, for example, 2-ethylhexanol; polyols and polyol ethers, for example, monoethyleneglycol, 1,3-propanediol, 1,3-butanediol, 2-butoxyethanol, 2-ethylhexanol, propylene glycol, butylene glycol, hexylene glycol, isoprene glycol, diethylene glycol, triethylene glycol, dipropylene glycol, ethylene glycol monomethyl ether, ethylene glycol monoethyl ether, propylene glycol monomethyl ether, diethylene glycol monomethyl ether, diethylene glycol monoethyl ether, as well as mixtures thereof. In preferred embodiments, the solvent is methanol.

Properties

The corrosion inhibitor compositions of the present disclosure, that is, compositions that include both the nitrogen-containing compound(s) and the sulfur-containing compound(s) in the given amounts or compositions of the nitrogen-containing compounds having an IV value above 120 and no sulfur-containing compounds, provide advantageous corrosion inhibition effects even when applied in concentrations as little as 20 ppm or as little as 15 ppm.

Such corrosion inhibition efficiency can be determined using Tafel analysis using equation 1 using a $CO_2$ bubble test or a Jet Impingement test:

$$\text{Corrosion Inhibition Efficiency (\%)} = (C_0 - C_i)/C_0 \times 100 \quad \text{(eq. 1)}$$

where $C_0$ is the corrosion rate of the working electrode in the testing solution without corrosion inhibitor and $C_i$ is the corrosion rate of the working electrode in the testing solution with the corrosion inhibitor composition.

In some embodiments, the corrosion inhibitor compositions have a corrosion inhibition (CI) efficiency of at least 95%, preferably at least 96%, preferably at least 97%, preferably at least 98%, preferably at least 99%, as determined by the $CO_2$ bubble test, which generates wall shear stress values ranging from 0 to 100 Pa. The corrosion inhibitor compositions herein are also unexpectedly superior under harsh wall shear stress conditions, such as those often found when flowing corrosive oil in water mixtures at high velocity through transportation pipelines and other oil and gas field equipment. The Jet Impingement test is a well-accepted method for testing corrosion inhibitors at high wall shear conditions, for example, from 150 to 500 Pa. In some embodiments, the corrosion inhibitor compositions have a corrosion inhibition (CI) efficiency of at least 70%, preferably at least 75%, preferably at least 80%, preferably at least 85%, preferably at least 90%, as determined by the Jet Impingement test.

Method of Making

Various methods may be used to make the corrosion inhibitor compositions of the present disclosure, and such methods are generally known to those of ordinary skill in the art. By way of example, the methods of formulating the inventive corrosion inhibitor compositions typically involve mixing the nitrogen-containing compound with the sulfur-containing compound to form a mixture, followed by vigorously agitating the mixture until a uniform clear solution is reached.

Any order of addition can be employed for the mixing step, that is, the nitrogen-containing compound may be added to the sulfur-containing compound, or vice versa. The nitrogen-containing compound (N) and the sulfur-containing compound (S) may be mixed in a N:S molar ratio of from 0.125:1, preferably from 0.2:1, preferably from 0.5:1, preferably from 1:1, preferably from 1.2:1, preferably from 1.3:1, preferably from 1.4:1, preferably from 1.5:1, preferably from 2:1, preferably from 3:1, and up to 50:1, preferably up to 40:1, preferably up to 30:1, preferably up to 20:1, preferably up to 10:1, preferably up to 5:1, preferably up to 4:1.

An organic solvent may be optionally added at this stage to aid solvation. When employed, the organic solvents may be added in amounts of at least about 40 wt. %, preferably at least about 45 wt. %, more preferably at least about 46 wt. %, even more preferably at least about 48 wt. %, yet even more preferably at least about 50 wt. %, and up to about 70 wt. %, preferably up to about 68 wt. %, more preferably up to about 66 wt. %, even more preferably up to about 62 wt. %, yet even more preferably up to about 60 wt. %, relative to a total weight of the mixture.

After obtaining the desired mixture, the mixture is next subjected to one or more, preferably two or more of the following agitation techniques until all ingredients are dissolved, and a uniform clear solution is reached: ultrasonication, microwave irradiation, high speed stirring, and heating.

In some embodiments, ultrasonication is employed, and the mixture is ultrasonicated at a power of at least 100 W, preferably at least 200 W, preferably at least 30) W, preferably at least 400 W, preferably at least 450 W, preferably at least 500 W, and up to 1,000 W, preferably up to 900 W, preferably up to 800 W, preferably up to 700 W, preferably up to 600 W. In some embodiments, the mixture is ultrasonicated at frequency of at least 20 kHz, preferably at least 25 kHz, preferably at least 30 kHz, preferably at least 35 kHz, preferably at least 40 kHz. and up to 100 kHz, preferably up to 90 kHz, preferably up to 80 kHz, preferably up to 70 kHz, preferably up to 60 kHz, preferably up to 50 kHz.

In some embodiments, microwave irradiation is employed, and the mixture is microwave irradiated, for example using a household or laboratory microwave oven, at a power of at least 500 W, preferably at least 550 W, preferably at least 600 W, preferably at least 650 W, preferably at least 700 W, and up to 2.000 W, preferably up to 1,500 W, preferably up to 1,000 W, preferably up to 900 W, preferably up to 800 W.

In some embodiments, high speed stirring is employed, and the mixture is stirred at a stirring rate of at least 1,000 rpm, preferably at least 1,500 rpm, preferably at least 2,000 rpm, preferably at least 2,500 rpm, preferably at least 3,000 rpm, an up to 5,000 rpm, preferably up to 4,500 rpm, preferably up to 4,000 rpm, preferably up to 3,500 rpm.

In some embodiments, heating is employed, and the mixture is heated to a temperature of at least 50° C., preferably at least 55° C., preferably at least 60° C., preferably at least 65° C., preferably at least 70° C., and up to 95° C., preferably up to 90° C., preferably up to 85° C., preferably up to 80° C., preferably up to 75° C.

Oil or Gas Field Methods

Petroleum oil and natural gas wells are typically subjected to numerous chemical treatments during their production life to enhance operation and protect the integrity of the asset. Corrosion of metal surfaces in aqueous media has long been a problem for the oil and gas industry. It is well-known that during the production of oil and gas, several other corrosive components are present, such as brines, organic acids, carbon dioxide, hydrogen sulfide, and microorganisms. These aggressive constituents can cause severe metal corrosion as demonstrated by surface pitting, embrittlement, and loss of metal. Corrosion issues are problematic for any drilling operation, but are even more troublesome in deep-sea operations where replacement of corroded equipment is difficult and costly. Therefore, it is common practice to employ corrosion inhibitors during the production, transportation, storage, and separation of crude oil and natural gas. However, currently employed corrosion inhibitors often suffer from poor effectiveness at low concentrations and particularly poor performance under harsh wall shear stress conditions common to production, transport, and separation of oil and gas, necessitating the need for large quantities of corrosion inhibitors to be used.

The present disclosure thus provides a method for inhibiting corrosion of metal in contact with a corrosive mixture in an oil or gas field environment with the corrosion inhibitor compositions described herein, in one or more of their embodiments. As will become clear, the corrosion inhibitor compositions herein are surprisingly effective at inhibiting corrosion of metal even at very low concentrations, and remain effective when employed at low concentrations even under high wall shear stress conditions.

The disclosed methods may be effective for inhibiting corrosion of metal caused by contact with various types of corrosive mixtures, including aqueous mixtures, produced petroleum or natural gas mixtures, and multi-phase mixtures such as water-oil mixtures and water-oil-gas mixtures. The corrosion inhibitor compositions herein are particularly effective when introduced into corrosive mixtures comprising at least one of carbon dioxide, a corrosive sulfur species (e.g., hydrogen sulfide, mercaptans, etc.), and brine, and may be used to combat corrosion in a wide variety of oil and gas production, transportation, and processing systems, including those containing produced gas, sour gas, sweet gas, heavy brines, conditioning solutions, and the like. Since $CO_2$ gas and hydrogen sulfide gas are considered acidic gases, in some embodiments, the corrosive mixture has a pH of 2 or higher, preferably 3 or higher, preferably 4 or higher, and up to 7, preferably up to 6, preferably up to 5.

The corrosion inhibitor compositions may be introduced into corrosive mixtures containing an aqueous phase with a brine concentration of at least 0.1 wt. %, preferably at least 0.2 wt. %, preferably at least 0.4 wt. %, preferably at least 0.6 wt. %, preferably at least 0.8 wt. %, preferably at least 1 wt. %, preferably at least 2 wt. %, preferably at least 3 wt. %, and up to 10 wt. %, preferably up to 9 wt. %, preferably up to 8 wt. %, preferably up to 7 wt. %, preferably up to 6 wt. %, preferably up to 5 wt. %, preferably up to 4 wt. %, relative to a total weight of the aqueous phase.

In some embodiments, the corrosive mixture is a multi-phase mixture containing brine and oil. The disclosed corrosion inhibitor composition can be used in both oil-rich multi-phase mixtures, for example in transportation/storage applications, as well as in water-rich corrosive mixtures, for example in production applications. The corrosive mixture may thus have a brine to oil ratio (w/o) by volume of at least 5:95, preferably at least 20:80, preferably at least 40:60, preferably at least 50:50, preferably at least 55:45, preferably at least 60:40, preferably at least 65:35, and up to 95:5, preferably up to 90:10, preferably up to 85:15, preferably up to 80:20, preferably up to 75:25, preferably up to 70:30.

The corrosion inhibitor compositions of the present disclosure may be deployed during upstream oil and gas processes, including, but not limited to, during exploration, field development, and production operations. Production operations in conventional oil and gas fields typically involve a primary recovery stage where petroleum/natural gas is recovered by utilization of natural energy, a secondary recovery stage where the internal pressure of the formation drops and prevents the oil/gas from flowing upwards spontaneously and thus water is injected into the formation to force the oil/gas out, and a tertiary recovery stage where a chemical enhanced oil recovery (EOR), a steam/heat EOR, or a supercritical $CO_2$ EOR process is used to extract any remaining oil/gas. While the corrosion inhibitor compositions may be used during any primary, secondary, or tertiary recovery production operation, in preferred embodiments, the corrosion inhibitor compositions are added to the water being injected during secondary recovery or during chemical EOR in the tertiary recovery of production operations, which occur after drilling, cementing and primary recovery have taken place.

The corrosion inhibitor compositions employed in the practice of this invention are also extremely and surprisingly effective in protecting oil and gas well tubing and field equipment from corrosion during midstream processes, including, but not limited to, transportation (e.g., by pipeline), processing, storage, and distribution of the produced oil/gas containing mixtures. During transportation, pipelines and other transport systems can be used to move crude oil or gas from production sites to refineries and deliver the various refined products to downstream distributors. The corrosion inhibitor compositions described herein are particularly effective for inhibiting corrosion of metal from corrosive mixtures containing $CO_2$ and/or $H_2S$ when employed for secondary recovery in upstream processes, and for transportation and storage in midstream operations.

The presently disclosed corrosion inhibitor compositions may be utilized in industrial systems, such as three phase production systems, two phase production systems (i.e., oil and water), produced oil systems, water injection, water disposal systems, gas condensate applications, gas compressors, and both natural and artificial lift well processes. In some embodiments, the corrosion inhibitor compositions may be injected down the annulus of a well and optionally flushed with solvent. In some embodiments, the corrosion inhibitor compositions may be injected through suitable injection lines to areas where corrosion can, or is likely to, occur through capillaries or umbilical lines (in many cases at the wellhead if suitable metallurgy is used downhole).

The corrosive mixtures in which the corrosion inhibitor compositions are applied to may be in contact with many different types of surfaces on tubing and field equipment that are susceptible to corrosion. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionating columns, cracking units, pump parts (e.g., parts of beam pumps), as well as downhole surfaces that may be impacted by corrosion from the corrosive mixtures, such as those pipes, pump parts such as sucker rods, electrical submersible pumps, screens and the like, which are positioned in a wellbore during production.

Any metal surface that may come into contact with the corrosive mixtures may be protected by the corrosion inhibitor compositions of the present disclosure. Typical metals found in oil and gas field environments that may be protected include carbon steels (e.g., mild steels, high-tensile steels, higher-carbon steels); high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof.

The corrosion inhibitor compositions may be added at any location of the oil and gas well or midstream transport, storage, or distribution system that is, or may be susceptible to, corrosion from contact with the corrosive mixtures. The addition of the corrosion inhibitor composition may be manual or it may be automatic, for example, by using chemical injection pumps. In some embodiments, the corrosion inhibitor composition may be stored in a chemical storage tank and a chemical injection pump associated therewith may be used to introduce the corrosion inhibitor composition into the desired location of the operation. In any of the above applications, the corrosion inhibitor compositions may be injected continuously and/or in batches. The chemical injection pump(s) can be automatically or manually controlled to inject any amount of the corrosion inhibitor composition suitable for inhibiting corrosion.

In general, the dosage of the corrosion inhibitor compositions may be dependent upon the corrosivity of the system, the water cut realized in the application, and the wall shear stress conditions at the metal surface. While concentrations above 100 ppm may be used, the corrosion inhibitor compositions employed in the practice of this invention are extremely and surprisingly effective in protecting oil and gas well tubing and other field equipment from corrosion in concentrations from about 5 ppm, preferably from about 10 ppm, preferably from about 15 ppm, preferably from about 20 ppm, preferably from about 25 ppm, preferably from about 30 ppm, preferably from about 35 ppm, preferably from about 40 ppm, preferably from about 45 ppm, preferably from about 50 ppm, and up to 100 ppm, preferably up to 90 ppm, preferably up to 80 ppm, preferably up to 70 ppm, preferably up to 60 ppm, even at temperatures up to 100° C., preferably up to 95° C., preferably up to 90° C., preferably up to 85° C., for example 20 to 90° C. To be equally effective under similar conditions, most corrosion inhibitors require dosages of at least 60 ppm in the best scenarios, and more commonly in dosages greater than 100 ppm, for example 200 ppm levels in order to reach the same level of corrosion inhibition effectiveness as the compositions of the present disclosure. For example, it has been discovered that the combination of a nitrogen-containing compound and sulfur-containing compound described herein provides a synergistic anti-corrosion effect (see, for example, Examples 2, 11, and 17 in Table 1) that enables the inventive corrosion inhibitor compositions to be employed in much lower amounts than previous corrosion inhibitors. Similarly surprising, is the finding that the use of nitrogen-containing compounds alone (i.e., without the sulfur-containing compound) having an IV value above 120 are much more effective than counterparts having lower IV values. This too, enables the corrosion inhibitor compositions to be introduced at such low ppm levels (for example, as low as 15 to 25 ppm). These concentrations may be directly measured from sampling the corrosive mixture after adding the corrosion inhibitor composition, and subjecting the sample to mass spectroscopy analysis. The temperature of the corrosive mixture may be measured using a thermocouple, for example, downhole in the wellbore, during transport in a pipeline, etc.

Perhaps more striking is the performance of the inventive corrosion inhibitor compositions under non-ideal conditions, that is, under conditions where the metal surface to be treated is under high wall shear stress. Pipelines and piping used in transport of corrosive mixtures of hydrocarbon products, $CO_2$, and/or $H_2S$ (e.g., multiphasic water-oil mixtures) are particularly prone to internal corrosion due to the high velocity of travel of the mobile phase through these transportation systems. Such high velocity travel poses significant problems for common corrosion inhibition systems because most systems use organic corrosion inhibitors which act by forming a thin film (order of nm) on the metal surface to form a protective barrier that suppresses corrosion by preventing or reducing contact of the corrosive species to the pipeline surface. The reduction in corrosion rate of these systems depends upon the structure and integrity of these films or layers. Any partial damage or removal of these films or layers may lead to initiation and propagation of localized corrosion through the development of galvanic cells. The effects of flow on the integrity of protective inhibitor films and corrosion product layers have been attributed to mass transfer, mechanical forces, and other factors such as the presence of solid particles. Flow enhances the mass transport of corrosive species (e.g., H+, $H_2S$, etc.) from bulk solution to the steel surface and accelerates the corrosion of the underlying steel, facilitates the mass transport of the corrosion product ($Fe^{2+}$) away from the steel surface hindering the formation of protective iron carbonate layers, and mechanically removes adhered film or prevents protective film formation altogether. Thus, protective films and corrosion product layers are known to fail at a high flow velocity with high wall shear stress (WSS) being the main culprit. To compensate for damaged and/or ineffectual film formation under such conditions where high wall shear stress may occur, the solution has been to significantly increase dosing of the corrosion inhibitor, in some case by orders of magnitude. This strategy, of course, comes with significant cost and environmental/clean-up concerns.

While the corrosion inhibitor compositions of the present disclosure are more effective under low wall shear stress conditions (e.g., 0 to 10 Pa) compared to previously known corrosion inhibition systems, their relative effectiveness at low concentrations becomes even more magnified as the wall shear stress of the system is increased, with dosages less than 100 ppm, less than 75 ppm, and even less than 50 ppm, providing suitable corrosion protection under wall shear stress conditions as high as 600 Pa, for example, from 10 Pa, preferably from 20 Pa, preferably from 30 Pa, preferably from 40 Pa, preferably from 50 Pa, preferably from 60 Pa, preferably from 70 Pa, preferably from 80 Pa, preferably from 90 Pa, preferably from 100 Pa, preferably from 150 Pa, preferably from 200 Pa. and up to 600 Pa, preferably up to 550 Pa, preferably up to 500 Pa, preferably up to 450 Pa, preferably up to 400 Pa, preferably up to 350 Pa, preferably up to 300 Pa, preferably up to 250 Pa (see for example Table 4). This superior efficacy under high shear stress conditions is unexpected, because like most corrosion inhibition systems, the nitrogen-containing compound (e.g., an imidazoline compound) of the present disclosure is also thought to act by a film forming mechanism.

In particular, using the above described dosages, the methods herein inhibit at least 95%, preferably at least 96%, preferably at least 97%, preferably at least 98%, preferably at least 99% of corrosion of the metal under a wall shear stress of 0 to 100 Pa compared to an otherwise identical method that does not introduce the corrosion inhibitor composition, as determined by Tafel analysis. Further, the methods herein inhibit at least 70%, preferably at least 75%, preferably at least 80%, preferably at least 85%, preferably at least 90% of corrosion of the metal under a wall shear stress of 150 to 500 Pa compared to an otherwise identical method that does not introduce the corrosion inhibitor composition, as determined by Tafel analysis.

Of course, the methods herein do not preclude introduction of other known chemical treatments into oil and gas field production and downstream transportation, distribution, and/or refining systems, and thus the corrosion inhibitor compositions may be used in conjunction with other chemical treatments known to those of ordinary skill in the art, including, but not limited to, hydrate inhibitors, scale inhibitors, asphaltene inhibitors, paraffin inhibitors, $H_2S$ scavengers, $O_2$ scavengers, emulsion breakers, foamers and de-foamers, buffers, and water clarifiers.

The examples below are intended to further illustrate protocols for preparing and testing the corrosion inhibitor compositions and are not intended to limit the scope of the claims.

EXAMPLES

Corrosion Inhibition Testing Protocols

A common method of testing the effectiveness of a corrosion inhibitor is a $CO_2$ bubble test. An electrochemical potentiostat in a 3-electrode configuration was used to make measurements which were evaluated using a linear polarization resistance technique (LPR hereinafter) in which a test coupon is monitored for the duration of the test. The test coupon was mounted in the test equipment, and then scans are made from +25 mV to −25 mV versus the open circuit potential. The scan rate was 0.5 mV per second. The equipment measures and generates the results automatically. The test was carried out in a customized brine and oil phase mixture. The brine concentration was 2% by weight percentage and the oil used was kerosene. An 80:20 (w/o) brine to oil ratio by volume was used. The liquid phase (the mixture of brine and oil) was deoxygenated and purged continuously with $CO_2$, and the test was carried out at 60° C. A blank result without the addition of corrosion inhibitor was firstly obtained. A desirable amount of corrosion inhibitor was then added into the solution for evaluation. The effectiveness of the corrosion inhibitor is represented by Corrosion Inhibition Efficiency (CI Efficiency) of the following equation:

Corrosion Inhibition Efficiency (%)=$(C_0-C_i)/C_0\times 100$ where $C_0$ is the corrosion rate measured for the blank solution, and the $C_i$ is corrosion rate measured under the presence of the corrosion inhibitor.

Another common method of testing the effectiveness of a corrosion inhibitor under turbulent conditions is Jet Impingement (JI). JI is a well-accepted method for evaluating corrosion inhibitors at high wall shear conditions. An electrochemical potentiostat equipment was used to make measurements which were evaluated using a LPR technique. The test working electrode was mounted under a jet nozzle in the test equipment. The jet nozzle is connected with a pump which continuously delivers the corrosion liquid from a reservoir tank. The jet nozzle sprays high-velocity corrosion liquid onto the surface of the test working electrode, which simulates the high shear stress conditions similar to that in the oil transporting pipeline. The scans were made from +25 mV to −25 mV versus the open circuit potential. The scan rate was 0.5 mV per second. The equipment measures and generates the results automatically. The corrosion testing was carried out in customized brine. The brine concentration was 1% by weight percentage. The corrosion liquid was deoxygenated and purged continuously with $CO_2$, and the test was carried out at 40° C. A blank result without the addition of corrosion inhibitor was firstly obtained. A desirable amount of corrosion inhibitor was then added into the solution for evaluation.

Corrosion Inhibitor Compositions and Preparation Methods Thereof

Several example corrosion inhibitor compositions are given below. As used below, "imidazoline compound" refers to a mixture of an imidazoline compound and fatty amide product of the same IV value (~66 to 71% by weight imidazoline compound) obtained from reaction between tall oil fatty acid and diethylenetriamine (DETA). Iodine values (IV) are determined using a modified Wijs protocol according to AOCS Official Method Tg 2a-64. All Amiet, Farmin, Diamin, Amphitol, Quartamin, and Sanisol products are commercially available from Kao.

Example 1 (Imidazoline Compound:MBT=4:1)

In an appropriate container, 0.4 mole (140 g) imidazoline compound and 0.1 mole (16.7 g) 2-MBT are added. An ultrasonicator with 20 kHz frequency and 500 W power is used to agitate the mixture until a uniform clear solution is formed.

Example 2 (Imidazoline Compound:MBT=2:1)

In an appropriate container, 0.2 mole imidazoline compound as used in EXAMPLE 1 and 0.1 mole (16.7 g) 2-MBT are added. An ultrasonicator with 20 kHz frequency and 500 W power is used to agitate the mixture until a uniform clear solution is formed.

Example 3 (Imidazoline Compound:MBT=1:1)

In an appropriate container, 0.1 mole imidazoline compound as used in EXAMPLE 1 and 0.1 mole (16.7 g) 2-MBT are added. The mixture is treated using a 700 W household microwave oven until a uniform clear solution is formed.

Example 4 (Imidazoline Compound:MBT=0.5:1)

In an appropriate container, 0.05 mole imidazoline compound as used in EXAMPLE 1, 0.1 mole (16.7 g) 2-MBT, and 34.2 g of methanol are added. The mixture is heated to 55° C. and stirred at 1000 rpm until a uniform clear solution is formed.

Example 5 (Imidazoline Compound:MBT=0.125:1)

In an appropriate container, 0.0125 mole imidazoline compound as used in EXAMPLE 1, 0.1 mole (16.7 g) 2-MBT, and 42.15 g of methanol are added. The mixture is heated to 85° C. and stirred at 3000 rpm until a uniform clear solution is formed.

Example 6 (Imidazoline Compound:Thiourea=0.5:1)

In an appropriate container, 0.05 mole imidazoline compound as used in EXAMPLE 1, 0.1 mole (7.61 g) thiourea, and 25.1 g of methanol are added. An ultrasonicator with 20 kHz frequency and 500 W power is used to agitate the mixture until a uniform clear solution is formed.

Example 7 (Imidazoline Compound:2-Mercaptobenzimidazole=1:1)

In an appropriate container, 0.1 mole imidazoline compound as used in EXAMPLE 1, and 0.1 mole (15 g) 2-mercaptobenzimidazole are added. An ultrasonicator with 20 kHz frequency and 500 W power is used to agitate the mixture until a uniform clear solution is formed.

Example 8 (Amiet 502:MBT=4:1)

In an appropriate container, 0.4 mole Amiet 502 and 0.1 mole (16.7 g) 2-MBT are added. An ultrasonicator with 20 kHz frequency and 500 W power is used to agitate the mixture until a uniform clear solution is formed.

Example 9 (Amiet 302:MBT=3:1)

In an appropriate container, 0.3 mole Amiet 302 and 0.1 mole (16.7 g) 2-MBT are added. The mixture is heated to 80° C. and stirred at 3000 rpm until a uniform clear solution is formed.

Example 10 (Farmin TD:MBT=2:1)

In an appropriate container, 0.2 mole Farmin TD, 0.1 mole (16.7 g) 2-MBT, and 70 g of methanol are added. An ultrasonicator with 20 kHz frequency and 500 W power is used to agitate the mixture until a uniform clear solution is formed.

Example 11 (Imidazoline Compound, IV 110)

Imidazoline compound with iodine value of 110 is used as is.

Example 12 (Imidazoline Compound, IV 130)

Imidazoline compound with iodine value of 130 is used as is.

Example 13 (Imidazoline Compound, IV 96)

Imidazoline compound with iodine value of 96 is used as is.

Example 14 (Amiet 502)

Amiet 502 is used as is.

Example 15 (Amiet 302)

Amiet 302 is used as is.

Example 16 (Farmin TD)

Farmin TD is used as is.

Example 17 (2-MBT)

2-MBT is used as is.

Example 18 (Farmin M2 2095)

Farmin M2 2095 is used as is.

Example 19 (Farmin M2 2095:MBT=4:1)

In an appropriate container, 0.4 mole Farmin M2 2095, 0.1 mole (16.7 g) 2-MBT, and 150 g of methanol are added. An ultrasonicator with 20 kHz frequency and 500 W power is used to agitate the mixture until a uniform clear solution is formed.

Example 20 (Diamin T)

Diamin T is used as is.

Example 21 (Diamin T:MBT=4.5:1)

In an appropriate container, 0.45 mole Diamin T and 0.1 mole (16.7 g) 2-MBT and 150 g of methanol are added. An ultrasonicator with 20 kHz frequency and 500 W power is used to agitate the mixture until a uniform clear solution is formed.

Example 22 (Amphitol 20N)

Amphitol 20N is 35% active with 65% water as the solvent, and it is used as is.

Example 23 (Amphitol 20N:MBT=5:1)

In an appropriate container, an amount of Amphitol 20N corresponding to 0.5 mole of amine oxide, 0.1 mole (16.7 g) 2-MBT, and 150 g of methanol are added. An ultrasonicator with 20 kHz frequency and 500 W power is used to agitate the mixture until a uniform clear solution is formed.

Example 24 (Quartamin 86W)

Quartamin 86W is 28% active with 72% water as the solvent, and it is used as is.

Example 25 (Quartamin 86W:MBT=2:1)

In an appropriate container, an amount of Quartamin 86W corresponding to 0.2 mole of quaternary ammonium chloride, 0.1 mole (16.7 g) 2-MBT, and 250 g of isopropanol are added. An ultrasonicator with 20 kHz frequency and 500 W power is used to agitate the mixture until a uniform clear solution is formed.

Example 26 (Sanisol D24P)

Sanisol D24P is 80% active with 20% water as the solvent, and it is used as is.

Example 27 (Sanisol D24P:MBT=1:1)

In an appropriate container, an amount of Sanisol D24P corresponding to 0.1 mole of Benzo dialkyl methyl ammonium chloride, 0.1 mole (16.7 g) 2-MBT, and 83.5 g of isopropanol are added. An ultrasonicator with 20 kHz frequency and 500 W power is used to agitate the mixture until a uniform clear solution is formed.

Corrosion Inhibition Testing

In the tables below, the headings include the example number, the composition of the corrosion inhibitor tested, and the % inhibition achieved at the particular relative concentrations of the corrosion inhibitor in unit of parts per million (ppm). * Denotes the example is a comparative example.

TABLE 1

| | Effectiveness of the sulfur-containing compound | | | | | |
|---|---|---|---|---|---|---|
| | N-compound (N) | S-compound (S) | N:S by mole | CI concentration | CI Efficiency (%) | Method |
| Example 11* | Imidazoline compound | none | none | 50 ppm | 62.2 | Jet impingement |
| Example 2 | Imidazoline compound | 2-MBT | 2:1 | 50 ppm | 89.1 | Jet impingement |
| Example 17* | none | 2-MBT | none | 50 ppm | 23.4 | Jet impingement |
| Example 11* | Imidazoline compound | none | none | 25 ppm | 67.5 | Bubble test |

TABLE 1-continued

Effectiveness of the sulfur-containing compound

| | N-compound (N) | S-compound (S) | N:S by mole | Cl concentration | Cl Efficiency (%) | Method |
|---|---|---|---|---|---|---|
| Example 2 | Imidazoline compound | 2-MBT | 2:1 | 25 ppm | 99.5 | Bubble test |
| Example 17* | none | 2-MBT | none | 25 ppm | 21.2 | Bubble test |
| Example 14* | Amiet 502 | none | none | 25 ppm | 3.4 | Bubble test |
| Example 8 | Amiet 502 | 2-MBT | 4:1 | 25 ppm | 95 | Bubble test |
| Example 15* | Amiet 302 | none | none | 25 ppm | 32 | Bubble test |
| Example 9 | Amiet 302 | 2-MBT | 3:1 | 25 ppm | 89.8 | Bubble test |
| Example 16* | Farmin TD | none | none | 25 ppm | 59.9 | Bubble test |
| Example 10 | Farmin TD | 2-MBT | 2:1 | 25 ppm | 76.3 | Bubble test |
| Example 6 | Imidazoline compound | Thiourea | 0.5:1 | 25 ppm | 97.8 | Bubble test |
| Example 7 | Imidazoline compound | 2-Mercapto-benzimidazole | 1:1 | 25 ppm | 86.7 | Bubble test |
| Example 18* | Farmin M2 2095 | none | none | 25 ppm | 1.42 | Bubble test |
| Example 19 | Farmin M2 2095 | 2-MBT | 4:1 | 25 ppm | 70.5 | Bubble test |
| Example 20* | Diamin T | none | none | 25 ppm | 63.5 | Bubble test |
| Example 21 | Diamin T | 2-MBT | 4.5:1 | 25 ppm | 85.9 | Bubble test |
| Example 22* | Amphitol 20N | none | none | 25 ppm | 0.15 | Bubble test |
| Example 23 | Amphitol 20N | 2-MBT | 5:1 | 25 ppm | 80.1 | Bubble test |
| Example 24* | Quartamin 86W | none | none | 25 ppm | 63.2 | Bubble test |
| Example 25 | Quartamin 86W | 2-MBT | 2:1 | 25 ppm | 92.6 | Bubble test |
| Example 26* | Sanisol D24P | none | none | 25 ppm | 31.6 | Bubble test |
| Example 27 | Sanisol D24P | 2-MBT | 1:1 | 25 ppm | 75.3 | Bubble test |

TABLE 2

N:S mole ratio

| | N-compound (N) | S-compound (S) | N:S by mole | Cl concentration | Cl Efficiency (%) | Method |
|---|---|---|---|---|---|---|
| Example 5 | Imidazoline compound | 2-MBT | 0.125:1 | 25 ppm | 93.7 | Bubble test |
| Example 4 | Imidazoline compound | 2-MBT | 0.5:1 | 25 ppm | 92.9 | Bubble test |
| Example 3 | Imidazoline compound | 2-MBT | 1:3 | 25 ppm | 98.4 | Bubble test |
| Example 2 | Imidazoline compound | 2-MBT | 2:1 | 25 ppm | 99.5 | Bubble test |
| Example 3 | Imidazoline compound | 2-MBT | 4:1 | 25 ppm | 95.9 | Bubble test |

TABLE 3

Iodine value (IV)

| | N-compound (N) | S-compound (S) | N:S by mole | Cl concentration | Cl Efficiency (%) | Method |
|---|---|---|---|---|---|---|
| Example 12 | Imidazoline compound, IV 130 | none | none | 25 ppm | 97.7 | Bubble test |
| Example 11* | Imidazoline compound, IV 110 | none | none | 25 ppm | 67.5 | Bubble test |
| Example 13* | Imidazoline compound, IV 96 | none | none | 25 ppm | 15.3 | Bubble test |

TABLE 4

Jet Impingement dosage dependence results

| | | | | Cl Efficiency (%) for each Cl concentration | | | |
|---|---|---|---|---|---|---|---|
| | N-compound (N) | S-compound (S) | N:S by mole | 15 ppm | 30 ppm | 50 ppm | Method |
| Example 11* | Imidazoline compound | none | none | 24.6 | 49.5 | 62.2 | Jet impingement |
| Example 2 | Imidazoline compound | 2-MBT | 2:1 | 51.9 | 80.4 | 89.1 | Jet impingement |
| Example 17* | none | 2-MBT | none | | | 23.4 | Jet impingement |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of inhibiting corrosion of metal in contact with a corrosive mixture in an oil or gas field environment, the method comprising:
   introducing a corrosion inhibitor composition into the corrosive mixture, wherein the corrosion inhibitor composition comprises:
   a nitrogen-containing compound having an alkyl amine group or an alkyl quaternary ammonium salt group; and
   at least one sulfur-containing compound selected from the group consisting of mercaptobenzothiazole and mercaptobenzoimidazole,
   wherein the nitrogen-containing compound is at least one compound selected from the group consisting of an imidazoline compound, an alkyl amine, a quaternary ammonium salt, an alkoxylated amine, an alkyl polyamine, and an amine oxide,
   wherein the corrosive mixture is a multi-phase mixture comprising brine and oil with a brine to oil ratio (w/o) of 5:95 to 95:5 by volume.

2. The method of claim 1, wherein the nitrogen-containing compound is an imidazoline compound formed from a reaction between a fatty acid or an ester derivative thereof and an alkyl polyamine compound containing at least one ethylene diamine group.

3. The method of claim 2, wherein the fatty acid is tall oil fatty acid, and wherein the alkyl polyamine compound is diethylenetriamine (DETA) or aminoethylethanolamine (AEEA).

4. The method of claim 1, wherein the nitrogen-containing compound is an unsaturated fatty amine or a polyalkoxylated unsaturated fatty amine.

5. The method of claim 1, wherein the nitrogen-containing compound has an iodine value above 120.

6. The method of claim 1, wherein the sulfur-containing compound is 2-mercaptobenzothiazole.

7. The method of claim 1, wherein a molar ratio (N:S) of the nitrogen-containing compound (N) to the sulfur-containing compound (S) is 2:1 to 5:1.

8. The method of claim 1, wherein the corrosive mixture has a pH of 2 to 7.

9. The method of claim 1, wherein the corrosive mixture comprises carbon dioxide, hydrogen sulfide, or both.

10. The method of claim 1, wherein the metal in contact with the corrosive mixture is under a wall shear stress of 10 to 600 Pa.

11. The method of claim 1, wherein the metal in contact with the corrosive mixture is under a wall shear stress of 150 to 250 Pa.

12. The method of claim 1, wherein the corrosion inhibitor composition inhibits corrosion of the metal at a temperature of 20 to 90° C.

13. A corrosion inhibitor composition comprising:
   a nitrogen-containing compound having an alkyl amine group or an alkyl quaternary ammonium salt group; and
   at least one sulfur-containing compound selected from the group consisting of mercaptobenzothiazole and mercaptobenzoimidazole;

wherein a molar ratio (N:S) of the nitrogen-containing compound (N) to the sulfur-containing compound (S) is 1:1 to 10:1.

14. The corrosion inhibitor composition of claim 13, wherein a molar ratio (N:S) of the nitrogen-containing compound (N) to the sulfur-containing compound (S) is 2:1 to 5:1.

15. The corrosion inhibitor composition of claim 13, wherein the nitrogen-containing compound is at least one compound selected from the group consisting of an imidazoline compound, an alkyl amine, a quaternary ammonium salt, an alkoxylated amine, an alkyl polyamine, and an amine oxide.

16. The corrosion inhibitor composition of claim 13, wherein:
the nitrogen-containing compound is an imidazoline compound formed from a reaction between a fatty acid or an ester derivative thereof and an alkyl polyamine compound containing at least one ethylene diamine group; and
the sulfur-containing compound is 2-mercaptobenzothiazole.

17. A corrosion inhibitor, comprising:
a nitrogen-containing compound having an alkyl amine group or an alkyl quaternary ammonium salt group;
at least one sulfur-containing compound selected from the group consisting of mercaptobenzothiazole and mercaptobenzoimidazole; and
an imidazoline compound with an iodine value above 120.

18. The corrosion inhibitor of claim 17, wherein the imidazoline compound is formed from a reaction between a fatty acid or an ester derivative thereof and an alkyl polyamine compound containing at least one ethylene diamine group.

19. The corrosion inhibitor of claim 18, wherein the fatty acid is tall oil fatty acid, and wherein the alkyl polyamine compound is diethylenetriamine (DETA) or aminoethylethanolamine (AEEA).

20. The method of claim 1, wherein the corrosive mixture is a multi-phase mixture comprising brine and oil with a brine to oil ratio (w/o) of 20:80 to 90:10 by volume.

* * * * *